March 11, 1930. R. T. ROMINE 1,750,131
AUTOMOBILE BODY HANDLING
Filed Feb. 2, 1927 5 Sheets-Sheet 1

Inventor:
Robert T. Romine
By Macleod, Calver, Copeland & Dike
Attorneys.

March 11, 1930. R. T. ROMINE 1,750,131
AUTOMOBILE BODY HANDLING
Filed Feb. 2, 1927 5 Sheets-Sheet 2

Inventor:
Robert T. Romine
By Macleod, Calver, Copeland & Dike
Attorneys.

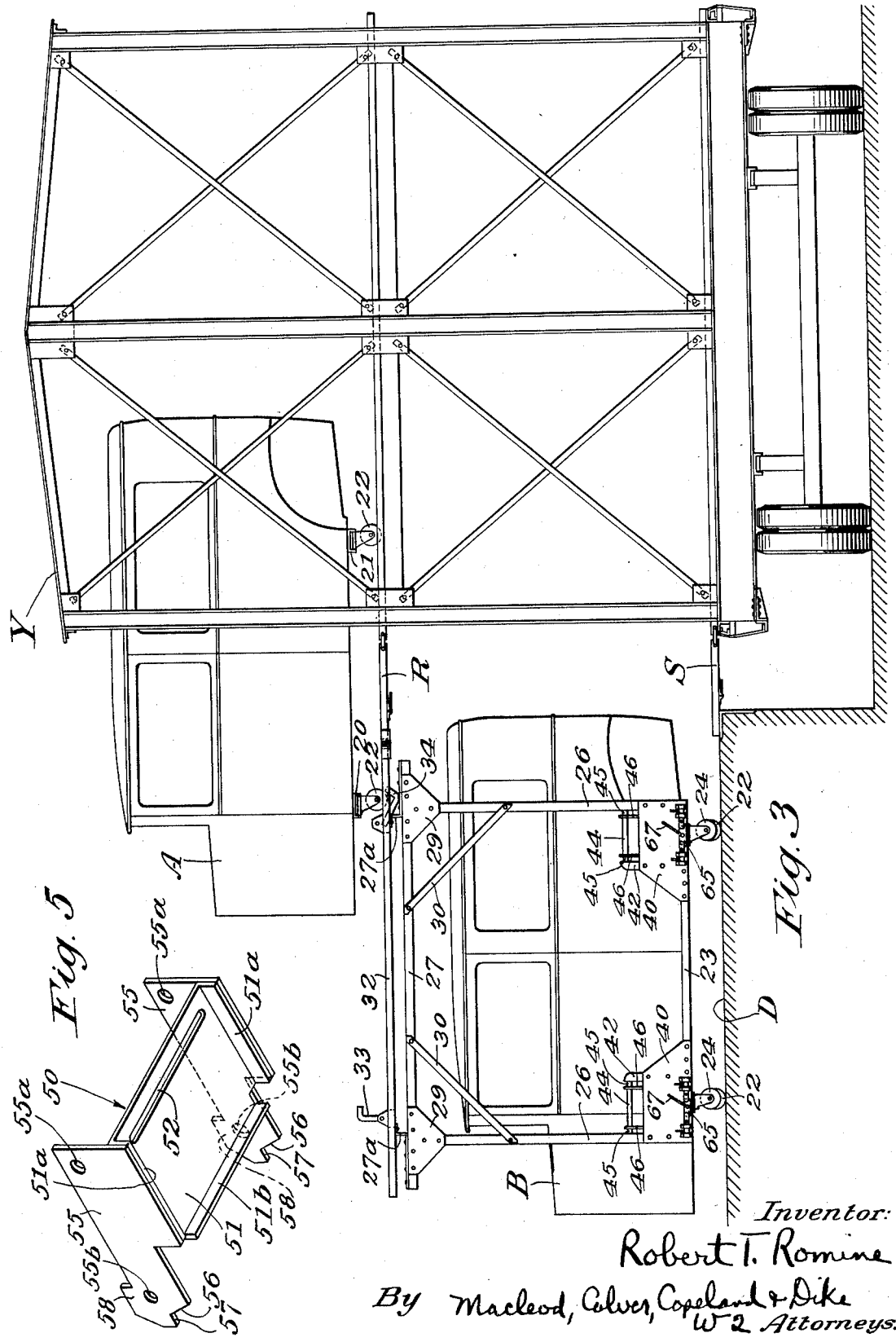

March 11, 1930. R. T. ROMINE 1,750,131
AUTOMOBILE BODY HANDLING
Filed Feb. 2, 1927 5 Sheets-Sheet 4
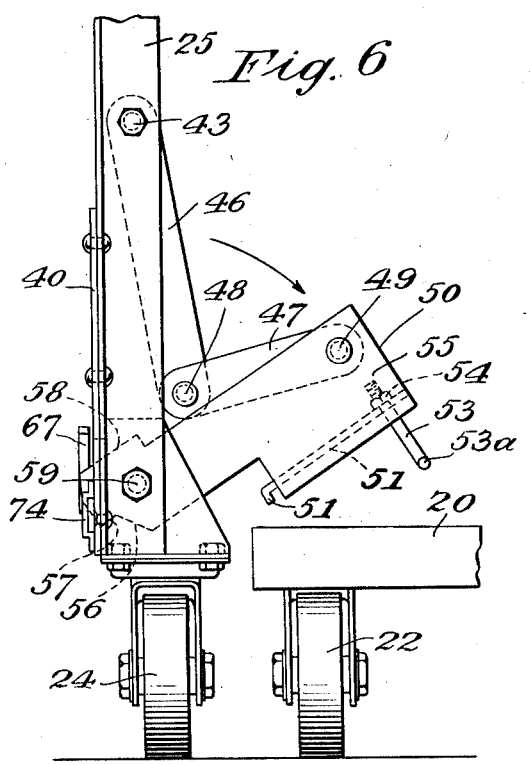
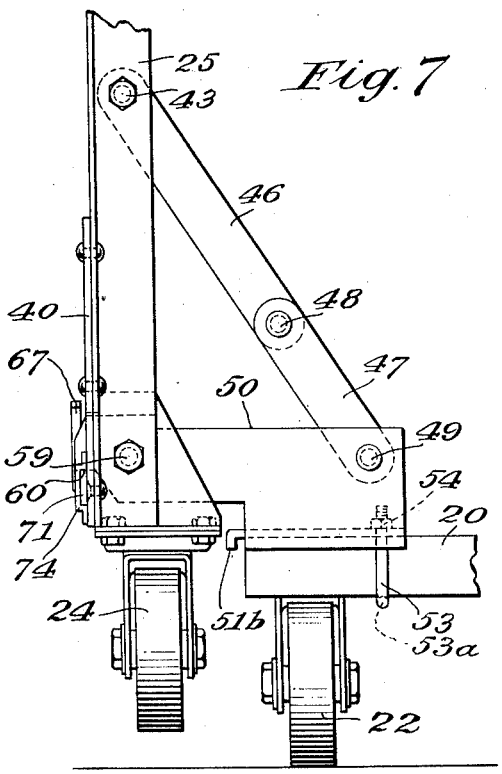
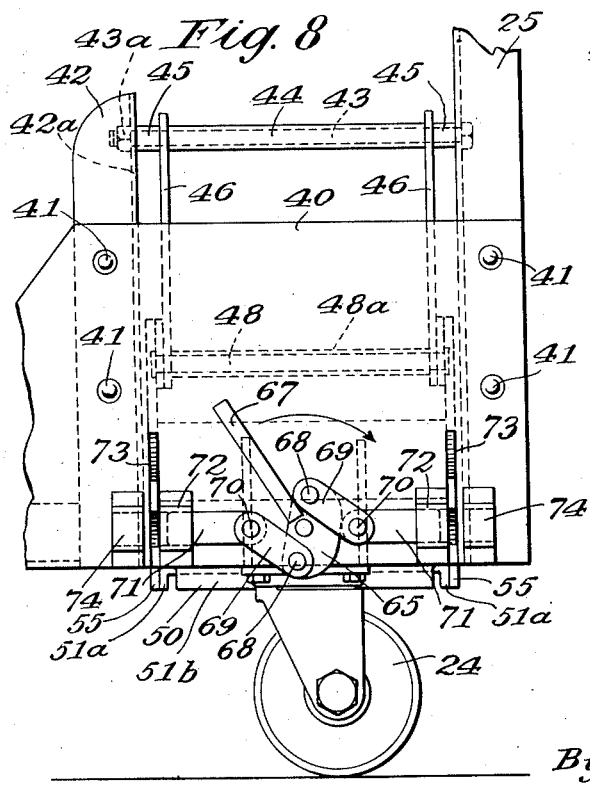
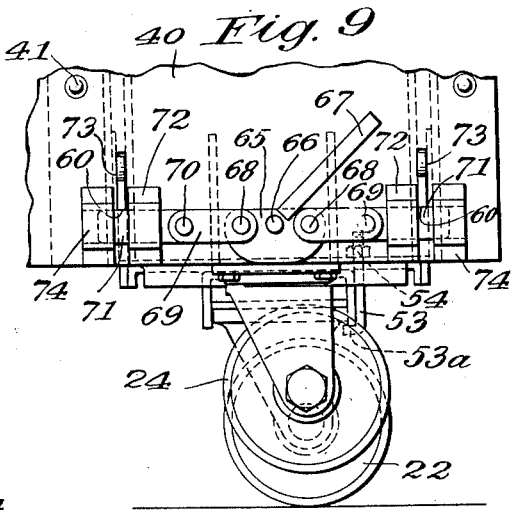
Inventor:
Robert T. Romine
By Macleod, Calver, Copeland & Dike
Attorneys.

March 11, 1930.                R. T. ROMINE                1,750,131
                         AUTOMOBILE BODY HANDLING
                         Filed Feb. 2, 1927          5 Sheets-Sheet 5
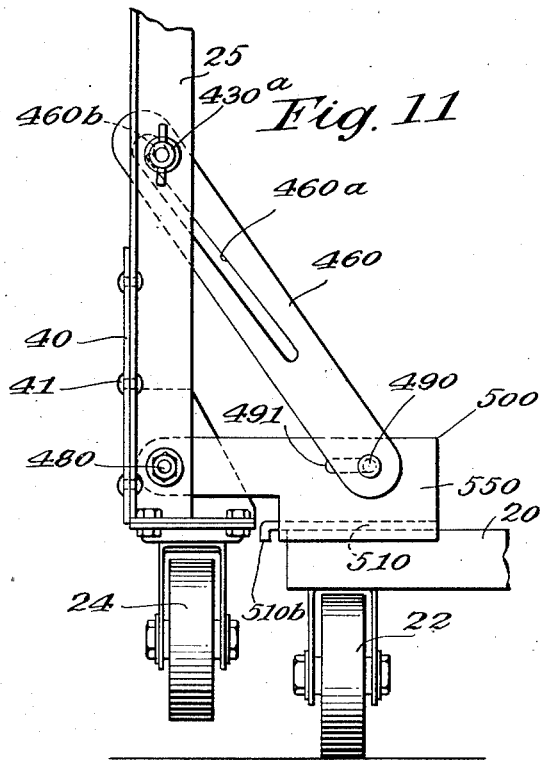
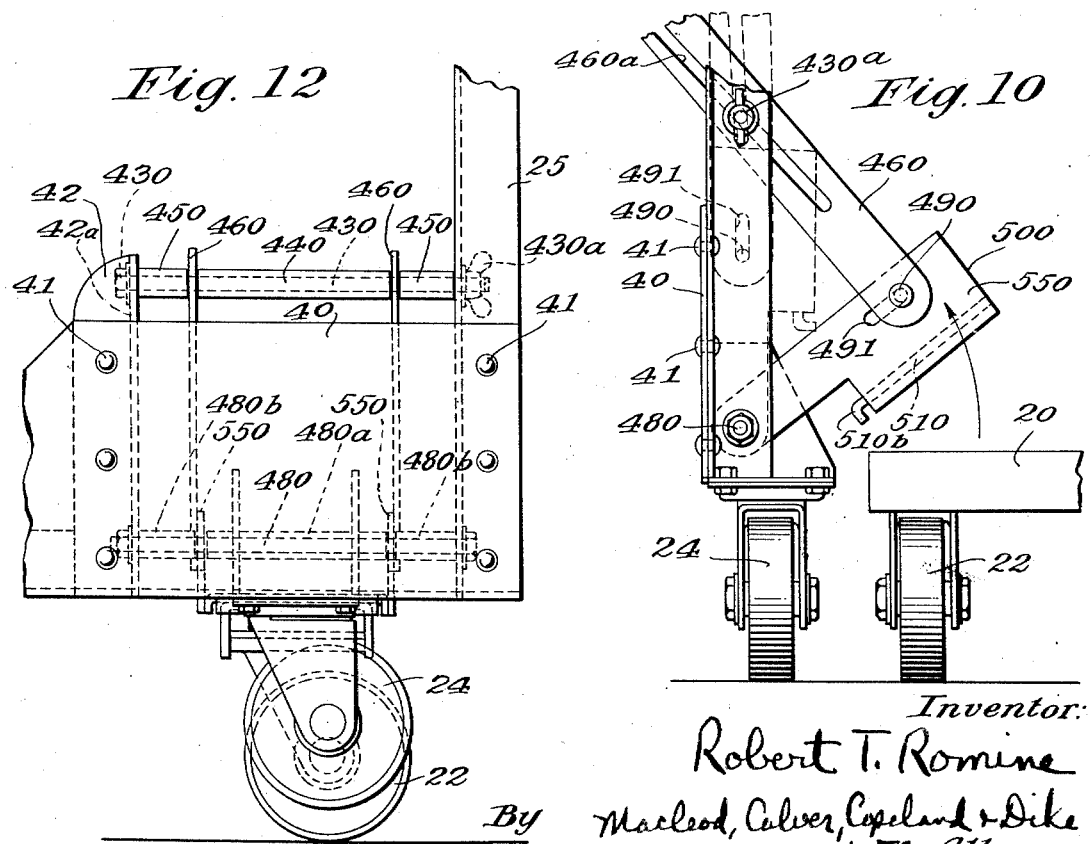
Inventor:
Robert T. Romine
By Macleod, Culver, Copeland & Dike
                          Attorneys.

Patented Mar. 11, 1930

1,750,131

UNITED STATES PATENT OFFICE

ROBERT T. ROMINE, OF MOUNT CLEMENS, MICHIGAN, ASSIGNOR TO HUDSON MOTOR CAR COMPANY, OF DETROIT, MICHIGAN, A CORPORATION OF MICHIGAN

AUTOMOBILE BODY HANDLING

Application filed February 2, 1927. Serial No. 165,380.

This invention relates to the handling, transporting and storing of automobile bodies in double-deck relation, the invention having for one of its objects the handling of automobile bodies in such manner as to require one half the floor or ground space heretofore required for moving, storing or housing bodies during production in factories, plants or storage places, and wherein a considerable saving in labor is made as well as enabling the bodies to be moved and conveyed from point to point more rapidly and easily and with less danger of marring, scratching or otherwise damaging the bodies where they are enameled or painted.

An important object of the present invention is to provide a body handling rack comprising a skeleton frame entirely open at the bottom so that a body, mounted upon paint sticks or other supporting means, may be moved into position within the frame. It is, therefore, apparent that with the construction herein defined, a considerable saving of materials, labor and expense is effected, since the frame work of the rack being entirely open at the bottom, the use of longitudinal, as well as transverse or cross frame members is eliminated. Likewise, the present construction eliminates the use of trackways for supporting the lower body with its caster bars connected thereto. Moreover, it is an object of the invention to utilize the casters of the paint sticks or caster bars which support the lower body as the means for allowing the movement of the rack about from place to place, while the rack itself is made independently portable by means of casters, wheels or the like to permit it to be moved about when empty or when a single automobile body, namely the upper body, is in position thereupon. It is also another object of the invention to provide simple, efficient and sturdy means for connecting the rack with the paint sticks or caster bars of the lower body, so as to support the rack entirely by the casters of these paint sticks.

Another object of the invention is to provide means for locking the rack or frame structure upon the paint sticks of the lower body to prevent the rack from becoming disengaged from the paint sticks.

The construction embodied in my co-pending application above referred to includes a rack in the form of a skeleton frame having upper and lower superimposed trackways thereupon for receiving and supporting, in double-deck relation, automobile bodies, the rack being provided with casters for permitting it to be moved about as desired. In that construction, however, the lower body with its paint sticks is supported, at all times, by the rack, whereas with the construction herein defined, this is not the case.

Other objects of the invention will be apparent as the description proceeds when read in conjunction with the accompanying drawings.

In said drawings:

Fig. 3 is a side elevation illustrating the unloading of the bodies double-deck, from a double-deck trailer or conveyance.

Fig. 5 is a detail perspective, on an enlarged scale, of one form of bracket or paint stick engaging means provided for supporting the rack by the paint stick.

Fig. 6 is a detail fragmentary view of one corner of the rack frame with one end of a paint stick or body supporting device positioned in close proximity thereto, the paint stick engaging means and locking means therefor being shown in angular relation to the frame and about to assume its operative position.

Fig. 7 is a view similar to Fig. 6, showing the parts in operative relation.

Figs. 8 and 9 are detail fragmentary views taken at right angles to Figs. 6 and 7, showing two positions of the frame and the locking means for the bracket or other paint stick engaging means.

Figure 1:
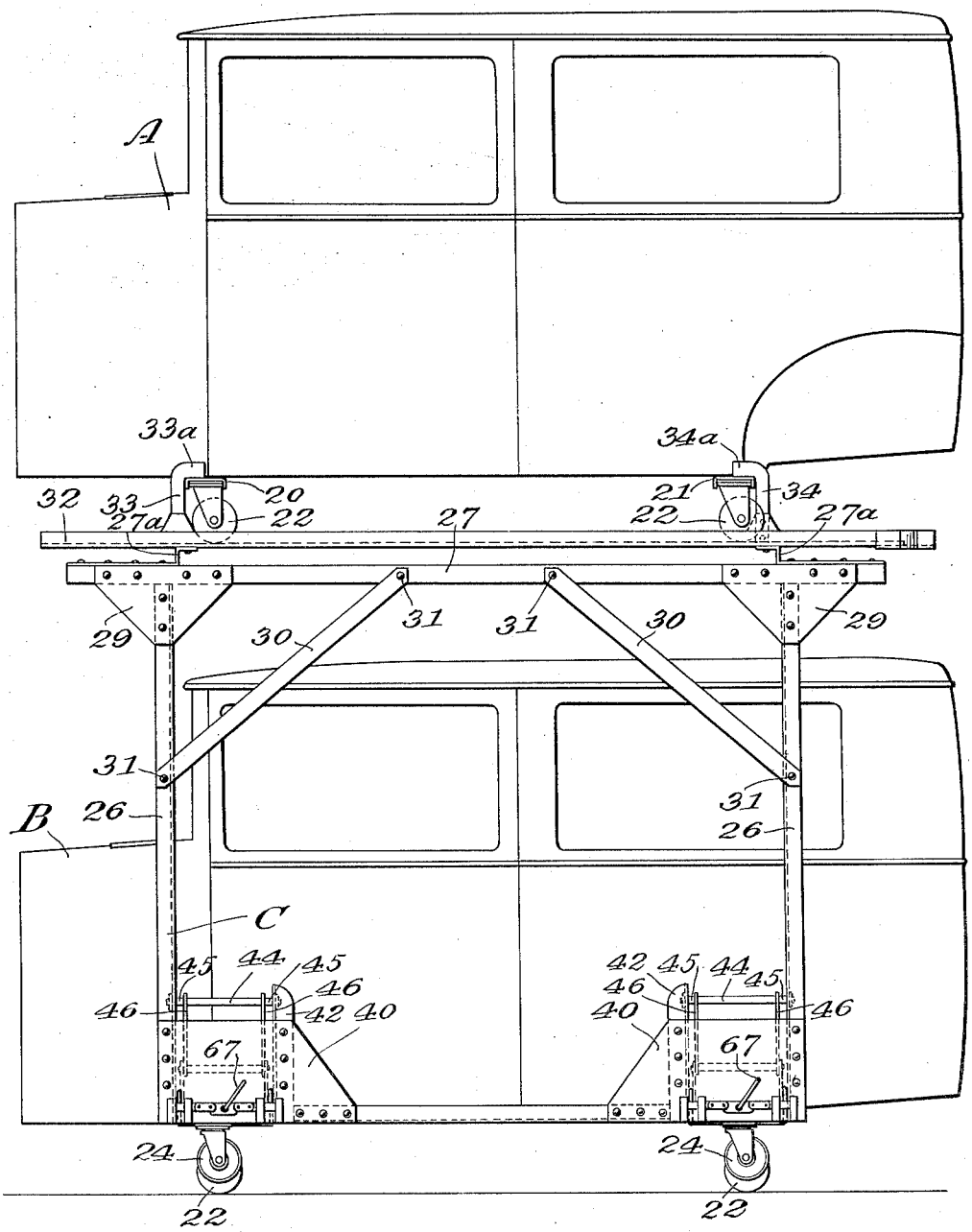
Fig. 1 is a side elevation of a portable rack or truck showing two automobile bodies positioned in double-deck relation.

Figs. 10, 11 and 12 are views similar to Figs. 6, 7 and 9, showing a modified form of construction, the parts being in substantially the same relationship as in Figs. 6, 7 and 9.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

The handling of automobile bodies in body and automobile plants, the transportation of finished bodies from body plants to factories where the bodies are assembled on the chassis of the cars, the movement of the bodies in the plants during process, the storage of finished or partly finished bodies and the movement of the bodies to or from the storage places has heretofore been done at great expense, labor and time. Considerable manual labor has been required in handling bodies during process. The bodies are often dragged from point to point, are lifted and deposited at successive stages in production or transportation and special equipment is required for lifting or hoisting bodies from place to place. Considerable valuable floor space must be allotted to the storage of a supply of bodies in advance of production requirements. Furthermore, the bake-off oven capacity in plants has been limited at any given time to the number of bodies occupying a given floor space or area.

One of the features of the present invention is to enable twice as many bodies to be handled, loaded, unloaded, or conveyed at one time, and twice as many bodies to be stored or operated upon in the same amount of floor space as heretofore, and twice as many bodes to be accommodated in the bake-off ovens than heretofore, as well as eliminating considerable labor and time in the movement of bodies during process or stages of production or transportation.

In Fig. 3, I have illustrated, by way of example, a stage in the handling of bodies where the bodies may, for instance, be transported from a body plant to the assembly plant on a conveyance such as a double-deck trailer Y, or any other suitable conveyance, such as a railway car. The trailer of this invention is substantially like that shown and described in my co-pending application, Serial No. 133,375, filed September 3, 1926. According to said application the trailer is constructed with upper and lower decks and a number of bodies, such as eight, may be carried on each deck, enabling such a vehicle to carry at one time as many as sixteen bodies arranged in double-deck relation. Each upper and lower pair of bodies A and B is mounted on a pair of front and rear so-called paint sticks or caster bars 20 and 21. Each of these paint sticks as described in my above mentioned application, comprises an inverted channel bar carrying at opposite ends thereof, a pair of swivelled caster wheels 22. Each paint stick is detachably connected with the bottom of the body so that the bodies may be readily moved from place to place on the floors of the plant. The channel bars or paint sticks, each having swivelled caster wheels, may be constructed in accordance with my co-pending application, Serial No. 133,372, filed September 3, 1926.

Figure 2:
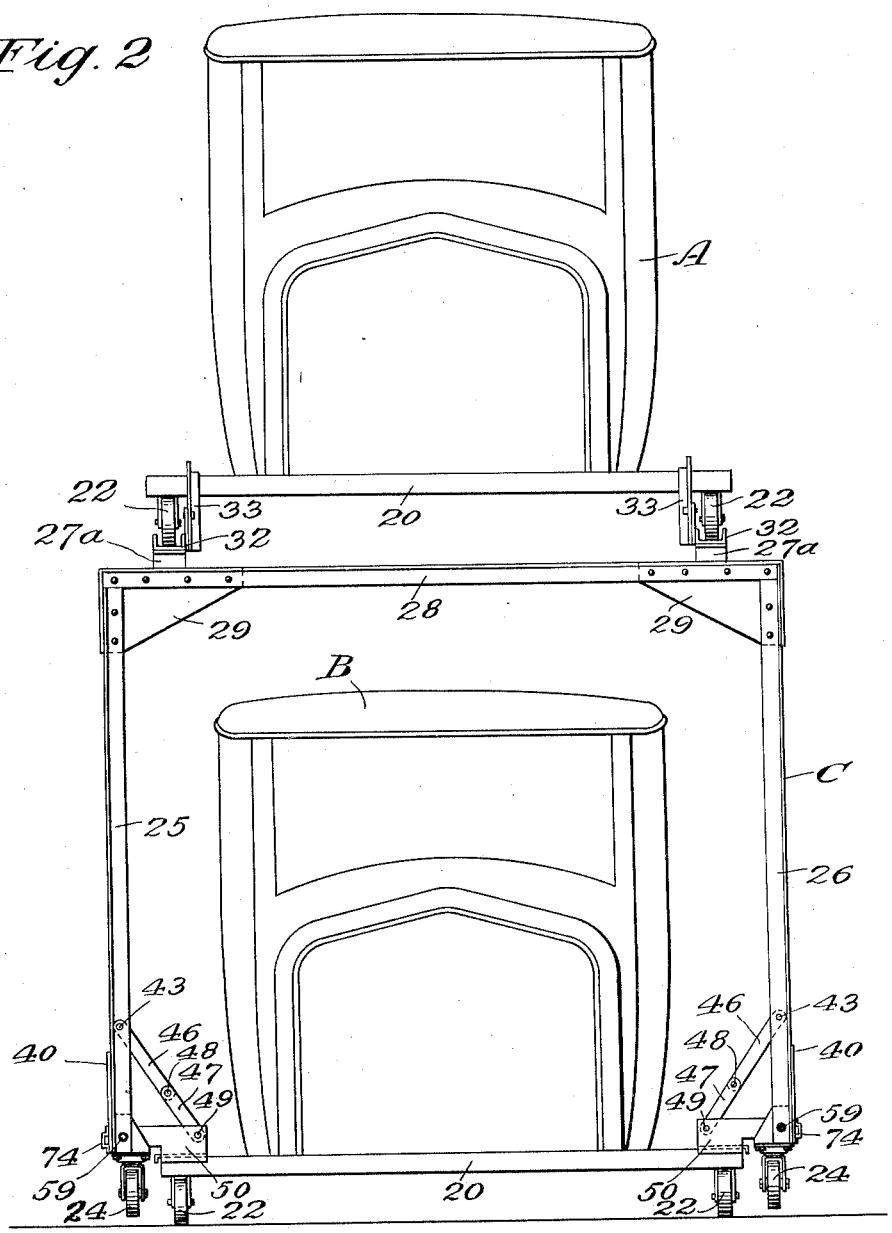
Fig. 2 is a front end elevation of the construction shown in Fig. 1.

In Figs. 1 and 2, I have illustrated a portable rack or truck frame constructed in such manner as to enable bodies to be carried in double-deck relation. This portable device, in the present instance, comprises a skeleton frame C entirely open at the bottom and constructed to house within the frame a lower body B and also constructed to carry on the top of the frame, an upper body A. The frame C is made up of a base comprising longitudinal side bars 23, preferably of angle iron construction. The longitudinal bars 23 each carry a pair of swivelled casters or wheels 24 positioned adjacent opposite ends thereof which may be of any suitable construction.

Mounted upon the longitudinal members 23 at opposite sides of the rack are a plurality of upright frame members 25 and 26 also preferably of angle iron construction, and these sets of frame members are connected at the top by means of a frame comprising lengthwise extending side bars 27, and transverse or crosswise extending frame members 28 at opposite ends of the frame work. The several top, side and bottom frame members forming the frame work of the rack, are suitable connected together at their joints by means of gusset plates 29, thereby providing a strong, rigid and relatively light portable rack or frame. To additionally strengthen the rack or frame at its corners, metal straps or strips 30 are provided which span the space between the vertical or upright frame members 25 and 26 and the top frame members 27, these straps 30 being rigidly connected with the frame members by means of bolts, rivets or the like 31.

Mounted upon the top frame members at opposite sides thereof and supported by brackets 27$^a$ riveted to the rack frame, is a pair of spaced parallel channel members or trackways 32 which are secured thereto. These channel members or trackways are spaced apart a distance suitable to accommodate the caster wheels 22 of the caster bars 20 and 21 and to form guides therefor. It will thus be seen that an automobile body previously mounted on front and rear caster bars 20 and 21 may be moved on its caster wheels directly onto the channel members or trackways 32 of the skeleton frame C with the caster wheels 22 travelling in the guide channels or trackways 32.

Means are provided for releasably locking the upper body in position upon the frame, and this means in the present embodiment of the invention comprises fixed locking members and releasable locking members substantially of the same character as those shown and described in my co-pending application Serial No. 141,133, filed October 12, 1926. Secured to the inner side of each of the channel guides or trackways 32 adjacent the forward end of the frame C, is a preferably fixed abutment 33, see Fig. 1. This member 33 is formed from an angle iron bar having an upstanding vertical portion and a rearwardly extending bent portion 33$^a$ forming a hook adapted to fit over the front caster bar 20. The member 33 is herein termed, for convenience, a locking member and also acts as an abutment or stop against which the front caster bar 20 engages when the body is rolled onto the channels or trackways 32.

Figure 4:
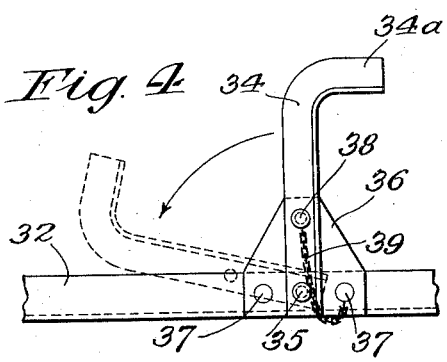
Fig. 4 is a detail elevational view of the locking means for maintaining the upper body in position upon the trackways of the rack.

A pair of rear locking members for the upper body is provided, each member being adapted to engage the caster bar 21, and comprises an angle iron bar 34 bent forwardly at its upper end 34$^a$, or in a direction toward the rearwardly bent end 33$^a$ of the member 33 previously referred to, to provide a hook similar to the front locking member 33. The lower end of the locking member 34 is pivoted at 35 to one of the guide channels 32. Positioned adjacent the pivot point 35 of the member 34, is a fixed gusset plate 36, rigidly connected by means of rivets or the like 37 with the channel 32. The gusset plate 36 and the flange of the member 34 adjacent the gusset plate, are each provided with aligned apertures adapted to receive, when the member 34 is in its vertical position (see Fig. 4), a locking pin 38 connected with a chain 39 or other suitable means, one end of which is attached to the gusset plate in any convenient manner, the purpose of the chain being to prevent the locking pin 38 from becoming lost in use.

From the foregoing it will be seen that when the upper body A is to be moved into position from the upper deck of the trailer Y across the gangway or channel extensions R onto the channels or trackways 32, the rear locking members 34 are in the position shown in Fig. 3, allowing the casters 22 of the front and rear paint sticks 20 and 21 to pass over them along the channels to position the upper body upon the rack as shown in Fig. 1. After the body has been thus moved into position, the locking members 34 are swung into a vertical position (full lines Fig. 4) and the pin 38 inserted in the aligned apertures formed in the gusset plate and the flange of each locking member 34, to hold the member 34 in engagement with the rear caster bar or paint stick 21. It will be seen that during the movement of the rack, it is impossible for the upper body, mounted upon its caster bars, to become released from its position upon the channels or trackways.

In the present embodiment of the invention, when the rack is not in use or is not supporting, for transportation or storage purposes, automobile bodies, it will be seen that the caster wheels, rollers or the like 24 are in engagement with the ground or floor. The lower body B, which is also mounted upon front and rear caster bars or paint sticks 20 and 21, respectively, is rolled upon the caster wheels 22 into position within the rack or skeleton frame C. When in this position, the means for locking the frame upon the caster bars or paint sticks of the lower body, is brought into play, this means constituting a very important feature of my invention. At opposite longitudinal corners of the frame, or in other words at the junction of the upright angle bars 25 and 26 and the longitudinal base angle bars 23, gusset plates 40, considerably larger than the gusset plates 29 previously referred to, are provided, these gusset plates being secured to the several members forming the frame by means of rivets, bolts or the like 41. In addition to the corner frame members 25 and 26, a short upstanding angle bar 42 is provided adjacent each corner, and serves as a support or bearing for a rod or bolt 43. The head of the bolt is in engagement with one flange of the upright frame member 25 and is provided with a nut which engages a flange of the upstanding angle bar 42. Surrounding the bolt 43 is a sleeve 44 positioned between and adapted to maintain in spaced relation, a pair of parallel links 46. Positioned between the links 46 and the members 25 and 42, to properly maintain the links in spaced relations with respect to said members, are short sleeves 45, which likewise surround the bolt 43. As a whole, the bolt or rod and the surrounding sleeves serves as a pivot or support for the parallel links 46. Each link 46 is connected with a short link 47 by means of a pivot pin or bolt 48 having a surrounding spacing sleeve 48$^a$. The opposite end of each link 47 is pivotally connected as by means of short bolts 49, to the outer end of a movable bracket or supporting member 50.

Each bracket 50 comprises a base plate 51 having side flanges 51$^a$ and a rear flange 51$^b$, and is provided, near its forward edge, with an elongated slot 52, which is adapted to receive an angle bolt 53, (Figs. 6, 7 and 9), said angle bolt having a hooked end portion 53ª and a nut 54 positioned above the base plate 51. The bolt 53 is adjustable in the slot transversely of the base plate 51. The member 50 is also provided with side plates 55 which are rigidly connected with the flanges 51ª by electric welding or any other suitable means so as to form an integral structure, (see Fig. 5). Adjacent the forward end at the upper corner of each plate 55 there is provided an aperture 55ª and adjacent the rear end of each plate, a similar aperture 55ᵇ, the purpose of which is hereinafter described. The rear end of each plate 55 is provided at its lower edge with a notch or cut-out portions 56 forming an abutment or shoulder 57, whereas the top rear edge of the plate is provided with a projecting portion 58, the purpose of the notches 56 and the projecting portions 58 being fully described hereinafter. The bracket or supporting member 50 is connected with the upright frame member 25 and with one flange of the up-standing angle bar 42 by means of short pins or bolts 59 (Figs. 6 and 7). It will be understood that the depending flanges 51ª at the ends of the bracket 50 and the flange 51ᵇ at the rear edge thereof are provided for the purpose of restricting the relative movement of the paint stick or caster bar with respect to the frame structure, and will positively prevent the paint stick from becoming disengaged from the bracket or frame supporting member 50, when the rack is moved about. The apertures or holes 55ª and 55ᵇ in the side plates 55, are adapted to receive the short bolts 49 which form the pivotal connection between the member 50 and the links 47, and similar bolts 59 forming the pivotal supporting means for the bracket to connect it with the uprights 25 and 42 respectively. It will thus be seen that each bracket 50 is movably connected with the frame structure so that it may be swung from an operative to an inoperative position with the least effort.

When each member 50 is moved to its horizontal position and into engagement with the paint stick 20, as shown in Fig. 7, whereby the frame C is supported solely by the paint sticks and their caster wheels, the links 46 and 47 assist in locking the members 50 in position. Additional means may be provided to prevent the movement of the member 50 from its horizontal operative position. Referring to Figs. 8 and 9 a cam plate 65 is pivotally mounted upon the gusset plate 40 for movement about the pivot 66. A handle 67 is rigidly connected with the cam plate 65 and serves to move it about the pivot 66. Connected with the cam plate 65 adjacent its opposite ends, by means of pivots 68, are a pair of short links 69. The opposite ends of the links are pivotally connected at 70 with latches 71, which latches, upon the oscillation of the cam 65 by operating the handle 67, are caused to be retracted or projected as shown in Figs. 8 and 9, respectively. A guide or keeper 72, as shown in Figs. 8 and 9, is provided for each latch 71, these guides 72 being positioned immediately adjacent the short vertically extending slots 73 provided in the enlarged gusset plate 40, through which slots the extreme outer ends of the end plates 55 of the bracket 50, project when the bracket 50 is moved about its supporting pivot. Adjacent each slot 73 and likewise mounted upon the gusset plate 40, and in alignment with the guides 72, are additional guides or keepers 74, provided for the purpose of receiving and supporting the latches 71 when in their projected position as shown in Fig. 9. When the member 50 is in its horizontal position, as shown in Fig. 7, the shoulder 57 (Figs. 5, 7 and 9) provided by the notch or cut-out portion 56, is engaged by the latch 71 which positively locks the member 50 against movement. The purpose of the projection or extension 58 at the rear edge of the side plates 55 is to provide an abutment for the latch 71 when the bracket 50 is in its vertical or inoperative position. By providing the projection 58 upon the inner end of each of the plates 55, it will be seen that when the movable bracket 50 is in its vertical position, the latch 71 will be positioned in contact therewith to prevent the bracket 50 from tipping inwardly or in a direction which would allow it to assume its horizontal position. As previously described, the bolt or hook 53 may be adjusted lengthwise of the slot 52. It may be added that, when the bracket 50, with its depending hook-shaped bolt, is moved from the position in which it is shown in Fig. 6 to the position of Fig. 7 and into engagement with the paint sticks 20, the hook 53ª at the end of the bolt 53 may be turned so as to hook under the flange of the caster bar 20 (Figs. 7 and 9).

In Figs. 10 to 12 inclusive, a modified form of paint stick engaging means or bracket 500, is shown. In this form of the invention, a pair of links 460 is provided, these links each having a longitudinally extending slot 460¹ terminating in a hook-like or bayonet slot portion 460ᵇ. The links 460 are hung or mounted upon a rod or support 430 having a comparatively long surrounding sleeve 440 for maintaining the links 460 in spaced relation, (Fig. 12), and a pair of relatively short surrounding sleeves 450 positioned between the links and the angle bars 25 and 42, respectively. The lower end of each link 460 is pivotally connected with the bracket 500 by means of a short pin 490. Each pin 490 fits in a short slot 491 formed in each side plate 550 of the bracket 500 to permit the link to have a slight relative movement with respect to the member 500. The rear end of each side plate 550 of the bracket 500 is pivotally connected with the members 25 and 42 by means of a bolt or rod 480 having a long surrounding sleeve 480ª positioned between the links 460, and short surrounding sleeves 480ᵇ positioned between each link and its adjacent upright frame member (25, 42), the sleeves serving to properly space the links between the members 25 and 42. In use, it will be understood that when each member 500 is in position upon the paint sticks 20, the flange 510ᵇ thereof prevents the endwise movement of the paint stick relative to the rack frame. Likewise, the member 500 is provided with a pair of depending side flanges 510ª which, together with the flange 510ᵇ, serve to positively prevent the displacement of the member 500 from its position upon the end of the paint stick. The hooked end or bayonet slot 460ᵇ of the link 460 serves as a stop or lock to prevent the upward accidental movement of the member 500 from its horizontal position, (Fig. 11), and by tightening the nut 430ª on the end of each bolt 430, the parts may be rigidly held in position.

The links 460 of the construction illustrated in Figs. 10 to 12 inclusive, are adapted to lie parallel to one flange of the frame member 25 and to the side plates of the member 500 when the bracket is in its inoperative position as shown in dotted lines in Fig. 10. To release each member 500 from engagement with the paint stick 20 and likewise to lower the frame from its supported position upon the paint stick, it is merely necessary to disengage the pin or bolt 430, by loosening the nut 430ª from the abutment formed at the hooked end portion 460ᵇ of the slot 460ª, to allow the link 460 to move upwardly relative to the supporting pin or bolt 430. By providing the slot 491 in each side plate of the member 500, the pivot pin 490, connecting the link 460 and the member 500, is adapted to travel in the slot when the parts are moved into their vertical position of Fig. 10. The nut 430ª may be tightened to maintain the links 460 in their vertical position.

In use, the rack is rolled into position upon the loading dock D, Fig. 3, and is supported by the casters 24, positioned along side of which is the double-deck conveyance Y. It will be noted that a gangway or channel extensions S are connected with the lower deck of the trailer and are moved into position to overlie the loading dock D, to allow the body B, supported upon its caster bars or paint sticks 20, and 21, to be rolled from the conveyance into position within the frame work of the rack. When in this position a workman grasps one side of the rack and tilts it up high enough to permit a workman to lower a pair of brackets 50 or 500, at that side of the frame, into locked position on the adjacent ends of the paint sticks. The workmen then lift the opposite side of the rack frame so as to enable the opposite pair of brackets 50 or 500 to be swung down into locking engagement with the opposite adjacent ends of the paint sticks or caster bars. It will be seen therefore, that when this operation is completed, the casters 24 of the frame are suspended in the air and the rack frame is entirely supported by the paint sticks of the lower body. Thereafter, the channel extensions R, connected with the upper deck of the conveyance, are brought into position in engagement with the channels or trackways 32, Fig. 3, the lock members 34 moved from vertical or operative position to the position shown in Fig. 3, and the upper body A mounted upon its paint sticks 20 and 21 having casters 22, rolled into position upon the trackways. The forward paint stick engages the fixed stop members 33 to prevent its further forward movement upon the rack. The members 34 are then swung into vertical position in engagement with the rear paint stick 21 and maintained in such position by means of removable pins 38, Fig. 4. It will be seen that when the bodies are in this double-deck relation, it is possible to transport the rack carrying such bodies from place to place without danger of the upper or lower bodies becoming disengaged from the rack. When in this position, the lower caster wheels 22 of the paint sticks 20 and 21 carry the entire weight of both bodies as well as the body rack. To release the upper body, it is merely necessary to manipulate the members 34 and roll the body off the channels or trackways 32.

In another application of mine I have shown and described a method and apparatus for removing the automobile bodies from the upper deck of the racks of this invention. Such apparatus comprises a tiering lift truck having a frame provided with tiltable trackways adapted to receive and support the casters upon which the upper body is mounted, and locking means for maintaining the body in position upon the frame. The trackways are adapted to tilt, and upon releasing the locking means the body is allowed to roll off the trackways onto the floor and be supported on the floor by means of its caster bars or paint sticks.

After unloading the upper body from the rack, the rack frame may be released from the caster bars of the lower body and lowered so as to rest on its own casters 24. The lower body may then be rolled out from between the side frames of the rack.

What I claim is:

1. A portable apparatus for carrying automobile bodies in double deck relation, comprising a frame, means for supporting the upper body on said frame, independent caster carrying bars for supporting the lower body, and means for connecting said frame to said bars.

2. A portable apparatus for handling automobile bodies one above the other in decked relation, comprising an arched frame adapted to house the lower body, means for supporting the upper body on said frame, caster carrying members for supporting the lower body, and devices carried by the frame and adapted to cooperate with the caster carrying members of the lower body for supporting the frame thereon.

3. A portable apparatus for handling automobile bodies one above the other in decked relation comprising a frame, caster carrying members for supporting each body, means for supporting a body on its casters on the frame, and means for supporting the frame and said last-named body on the caster carrying members of the other body.

4. A portable apparatus for handling automobile bodies one above the other in decked relation, comprising an arched frame adapted to house a body, caster carrying members for supporting each body, means for supporting and locking on the frame a body mounted on the caster members, and means for supporting and locking the frame and said last-named body on the caster carrying members of the other body.

5. In a portable apparatus for carrying automobile bodies in double deck relation, comprising a frame having casters, independent caster means for movably supporting each of said bodies, and means carried by the frame for operatively connecting the frame with said lower body supporting means to transfer the weight of the frame from the casters for supporting the frame to the caster means for movably supporting the lower body.

6. In combination with a rack for handling automobile bodies in double deck relation, caster supports for each of said bodies, means carried by the rack for engaging the caster supports of the lower body to transfer the weight of the rack from its supporting means to said lower body caster supports, and locking means for said first mentioned means.

7. In combination with a rack for handling in double-deck relation a pair of automobile bodies having independent caster supports, of means operatively connected with the rack for attaching the same to one of the caster supports for the lower body and for supporting the upper body thereupon.

8. A portable apparatus for carrying automobile bodies in double-deck relation, comprising a skeleton frame having movable supporting means, independent caster means for supporting each of said bodies, means on top of the frame for receiving and supporting the caster means of the upper body, and means associated with the frame adapted to be removably connected with the caster means for the lower body to support the frame above the ground and to transfer the weight of the frame from the frame supporting means to the lower body supporting means.

9. A portable apparatus for handling automobile bodies comprising a rack, independent movable supports for each of said bodies, trackways connected with the rack and providing means for supporting the upper body, casters for supporting the rack, locking means for retaining the upper body in position upon the trackways, and pivotal supporting means connected with the rack at opposite sides thereof adapted to be moved into cooperative relation with the movable supports for the lower body for supporting the rack off the ground, whereby the weight thereof is transferred from the rack casters to the lower body supports.

10. A portable apparatus for handling automobile bodies comprising a rack, independent movable supports for each of said bodies, trackways connected with the rack and adapted to receive and support one of said bodies, means for locking the body in position upon the trackways, means comprising a movable bracket connected with the rack and adapted to be detachably connected with the independent supports for the other body, and locking means for maintaining the bracket in operative position with respect to the body supporting means.

11. A rack having casters for carrying automobile bodies one above the other in double-deck relation, supporting casters for each of said bodies, channel members on said rack adapted to receive the casters of the upper body, means for locking said casters upon the channel members, means carried by the rack movable into and out of operative relation with the casters of the lower body for supporting the rack thereon, and means for positively maintaining said first mentioned means in operative or inoperative position.

12. In combination with a rack for handling automobile bodies in double-deck relation and caster supports for supporting each body, of means carried by the rack for detachably connecting said rack to the caster supports for the lower body to support the rack thereupon, and locking means for said first mentioned means.

13. In combination with a rack for handling automobile bodies in double-deck relation having independent caster supports, said rack being open at the bottom to receive a body and having a pair of guideways thereabove for the casters of the upper body, of means adjacent the guideways for maintaining the body in position thereupon, said means comprising a pivoted hook member adapted to be swung into and out of engagement with a caster support, and means for locking the hook member in operative position.

14. In combination with a rack for handling automobile bodies in double-deck relation having independent movable supports, said rack being open at the bottom and having a pair of trackways for receiving the supports for one of said bodies, of a gusset plate fixedly connected with one of said trackways, a hook pivotally connected with the trackway and adapted to be positioned adjacent the gusset plate for maintaining the body in position upon the trackways, and locking means cooperating with said gusset plate and hook for maintaining the hook in operative position.

15. In combination with a rack having casters for handling automobile bodies each provided with independent movable supports, of a movable bracket operatively connected with the rack adapted to be moved into engagement with the support for one of said bodies, said bracket being directly connected at one end to the rack frame, link members connecting its opposite end to the frame, and locking means for maintaining the bracket in operative relation to the body supporting means.

16. In combination with a rack for handling automobile bodies, each having independent caster supports, of means for directly connecting the rack with the supports for one of said bodies, said means comprising a bracket pivotally connected at one end with the frame work of the rack, link means connecting the opposite end of the bracket with said frame work, and locking means for maintaining the bracket and its link means in predetermined positions.

17. In combination with a rack for carrying automobile bodies double-deck, each body having caster supports, of means for directly connecting the rack with the caster supports of one of said bodies, said means comprising a bracket pivotally connected at one end with the frame work of the rack, a link having a movable connection with the opposite end of the bracket, and also having a connection with the rack framework, said connection comprising a pin and bayonet slot and means for securing the pin in fixed position in the slot.

In testimony whereof I affix my signature.

ROBERT T. ROMINE.